Dec. 20, 1949  M. E. McCLAY, SR  2,491,993
LAWN TRIMMER
Filed Nov. 17, 1947  2 Sheets-Sheet 1
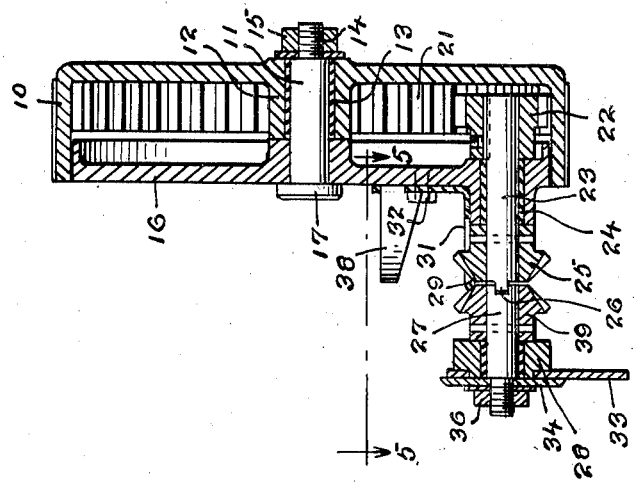
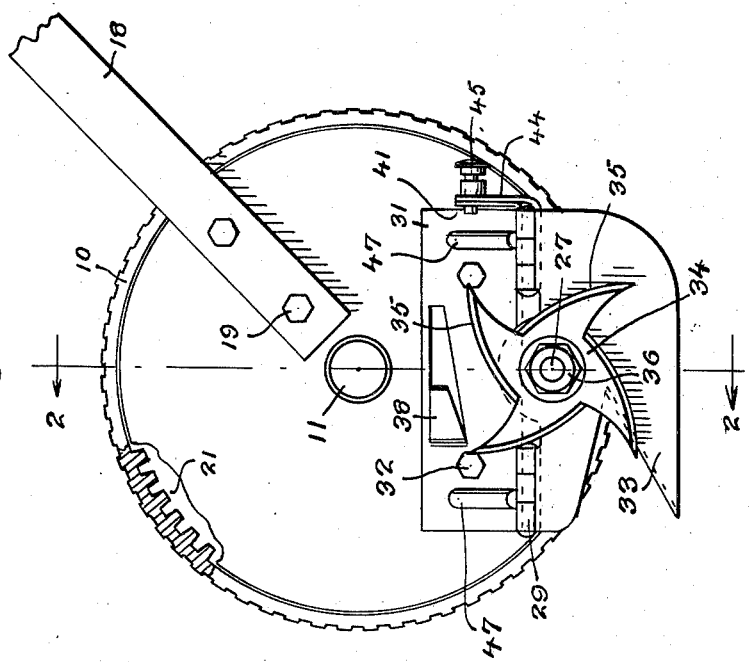
INVENTOR.
Martin E. McClay, Sr.
BY Victor J. Evans & Co.
ATTORNEYS Dec. 20, 1949  M. E. McCLAY, SR  2,491,993
LAWN TRIMMER
Filed Nov. 17, 1947  2 Sheets-Sheet 2

INVENTOR.
Martin E. McClay, Sr.
BY Victor J. Evans & Co.
ATTORNEYS

Patented Dec. 20, 1949

2,491,993

UNITED STATES PATENT OFFICE 2,491,993

LAWN TRIMMER

Martin E. McClay, Sr., Roseburg, Oreg.

Application November 17, 1947, Serial No. 786,352

3 Claims. (Cl. 56—256)

This invention relates to a lawn trimmer.

It is an object of the present invention to provide a lawn trimmer wherein the cutting element can be elevated to a horizontal use position and also to a position out of driving relationship with the driving wheel and wherein the same can be extended into a vertical use position and drivingly connected with the driving wheel by a simple operation of lowering the cutting tool to its ground-engaging position.

Other objects of the present invention are to provide a lawn trimmer having a blade arrangement which can be elevated, which is of simple construction, inexpensive to manufacture and efficient in operation.

For other objects and for a better understanding of the invention, reference may be had to the following detailed description taken in connection with the accompanying drawing, in which Fig. 1 is a side elevational view of the lawn trimmer with the cutting blade in the lowered position and ready for use.

Fig. 2 is a sectional view, in elevation, taken on line 2—2 of Fig. 1.

Figure 3:
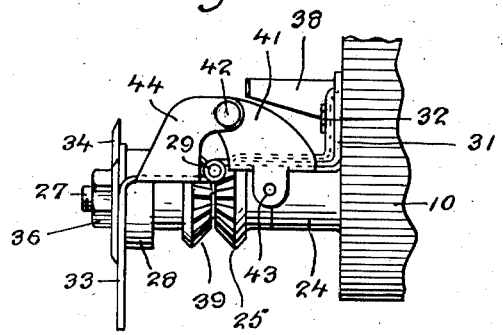
Fig. 3 is a fragmentary rear elevational view of the trimmer with the cutting element in the lowered and operating position.

Referring now to the figures, 10 represents a driving or traction wheel adapted to roll upon the ground and from which there is extended a shaft or axle 11. The wheel has a hub 12 and within this hub there is a sleeve bearing 13 engaging with the axle 11. The axle 11 has a threaded portion 14 on a nut 15 for retaining the axle within a plate or disc 16 lying within the wheel 10. The axle 11 has a tight fit within the plate and its head 17 will lie against the outer face of the same. A handle 18 extends upwardly from the plate 16 and is secured thereto by bolts 19.

The wheel 10 has internal gear teeth 21 adapted to drive a pinion 22 fixed to a jackshaft 23 which is journalled in a bearing sleeve projection 24 on the lower end of the disc 16. To the jackshaft 23 there is connected a bevel gear 25. The jackshaft 23 has a clutch projection 26 adapted to be engaged by a cutter shaft 27 having a clutch jaw. This shaft 27 is journalled in a bracket or support 28 which is hinged as indicated at 29 to a bracket 31 fixed by a screw 32 to the plate 16.

On the support 28 is a guide or fixed knife 33 with which a rotating blade 34 cooperates to trim the lawn. The rotating star shaped blade 34 has four cutting edges 35 thereon and is fixed to the shaft 27 to be rotated by the same. A nut 36 secures the blade 34 upon the shaft 27.

If it is desired to elevate the rotary blade to a horizontal position, the support 28 is tilted upwardly and is caught on a spring projection 38 struck from the bracket member 31. On the shaft 27 is a bevel gear 39 adapted to mesh with the bevel gear 25 of the shaft 23 when the bracket with the rotary blade has been hinged upwardly.

Figure 4:
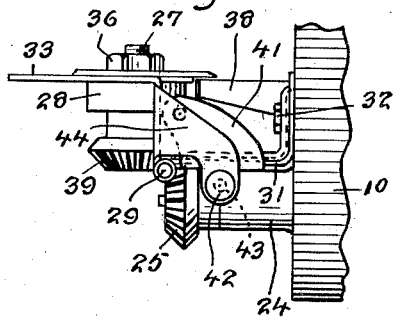
Fig. 4 is a fragmentary rear elevational view of the trimmer with the cutting element raised to the horizontal use position.
Figure 5:
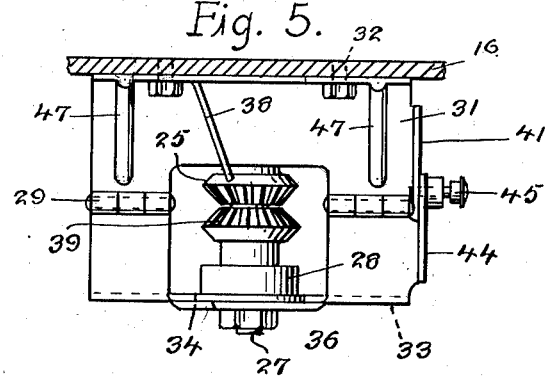
Fig. 5 is a fragmentary and top plan view of the trimmer taken on line 5—5 of Fig. 2.

In order to hold the bracket and the blade in the two positions there is provided, as shown in Fig. 3, a projection 41 having a hole into which a screw 42 may fit and a hole 43 in which the same screw can fit when the bracket and the rotary blade have been hinged upwardly to the position shown in Fig. 4. The screw also connects with a projection 44 on the bracket and which may be formed as an integral portion of the knife 33. At times when it is not desired to drive the rotary blade when elevated to a horizontal position, the bracket will be extended to engage with the struck projection 38 and the screw as indicated at 45 made free of the hole 43. Strengthening ribs 47 are provided in the bracket 31.

It should now be apparent that there has been provided a lawn trimmer which can be operated either in the position with the rotary blade extending vertically or in a position where the rotary blade extends horizontally and wherein by further adjustment the rotary blade can be held in an elevated position and free of its driving connection.

While various changes may be made in the detail construction, it shall be understood that such changes shall be within the spirit and scope of the present invention as defined by the appended claims.

I claim:

1. In a lawn trimmer, the combination which comprises a traction wheel with a web at one side having a peripheral flange with an internal gear therein and having a centrally disposed hub, a plate in the wheel positioned in the side thereof opposite the web, an axle carried by the plate and on which the wheel is journaled through the hub thereof, a horizontally disposed jack shaft journaled in the said plate and extended from both sides thereof, a pinion on the inner end of the jack shaft meshing with the internal gear of the wheel, a bevel gear on the outer end of the jack shaft, a bracket mounted on the plate and having a hinge hub on the outer edge thereof, the axis of said hub being positioned on the pitch circle of the bevel gear, a support L-shaped in cross section, hinged to the said hinge hub of the bracket, said support having a knife edge thereon, a cutter shaft journaled in the said support, a bevel gear on said cutter shaft positioned to mesh with the said bevel gear on the horizontally disposed shaft with the cutter shaft vertically positioned, a star cutter mounted on the cutter shaft and positioned to coact with the knife edge of the support, latch means retaining the said support with the cutter shaft in the vertical position, and a handle extended from the said plate in the wheel.

2. In a lawn trimmer, the combination which comprises a traction wheel with a web at one side having a peripheral flange with an internal gear therein and having a centrally disposed hub, a plate in the wheel positioned in the side thereof opposite the web, and an axle carried by the plate and on which the wheel is journaled through the hub thereof, a horizontally disposed jack shaft journaled in the said plate and extended from both sides thereof, a pinion on the inner end of the jack shaft meshing with the internal gear of the wheel, a bevel gear on the outer end of the jack shaft, a bracket mounted on the plate and having a hinge hub on the outer edge thereof, the axis of said hub being positioned on the pitch circle of the bevel gear, a support L-shaped in cross section, hinged to the said hinge hub of the bracket, said support having a knife edge thereon, a cutter shaft journaled in the said support, a bevel gear on said cutter shaft positioned to mesh with the said bevel gear on the horizontally disposed shaft with the cutter shaft vertically positioned, a star cutter mounted on the cutter shaft and positioned to coact with the knife edge of the support, latch means retaining the said support with the cutter shaft in the vertical position, and means retaining the support upwardly with the gears disengaged.

3. In a lawn trimmer, the combination which comprises a traction wheel with a web at one side having a peripheral flange with an internal gear therein and having a centrally disposed hub, a plate in the wheel positioned in the side thereof opposite the web, and an axle carried by the plate and on which the wheel is journaled through the hub thereof, a horizontally disposed jack shaft journaled in the said plate and extended from both sides thereof, a pinion on the inner end of the jack shaft meshing with the internal gear of the wheel, a bevel gear on the outer end of the jack shaft, a bracket mounted on the plate and having a hinge hub on the outer edge thereof, the axis of said hub being positioned on the pitch circle of the bevel gear, a support L-shaped in cross section, hinged to the said hinge hub of the bracket, said support having a knife edge thereon, a cutter shaft journaled in the said support, a bevel gear on said cutter shaft positioned to mesh with the said bevel gear on the horizontally disposed shaft with the cutter shaft vertically positioned, a star cutter mounted on the cutter shaft and positioned to coact with the knife edge of the support, latch means retaining the said support with the cutter shaft in the vertical position, and with the handle extended from the said plate in the wheel, said jack shaft having a tongue on the end thereof and said cutter shaft having a slot in the inner end positioned to receive the tongue of the jack shaft when the cutter shaft is aligned with the jack shaft.

MARTIN E. McCLAY, Sr.

REFERENCES CITED

The following references are of record in the file of this patent:

UNITED STATES PATENTS

| Number | Name | Date |
|---|---|---|
| Re. 21,274 | Orr | Nov. 21, 1939 |
| 207,829 | Stephenson | Sept. 10, 1878 |
| 964,882 | Reynolds | July 19, 1910 |